United States Patent Office 3,363,729
Patented Jan. 16, 1968

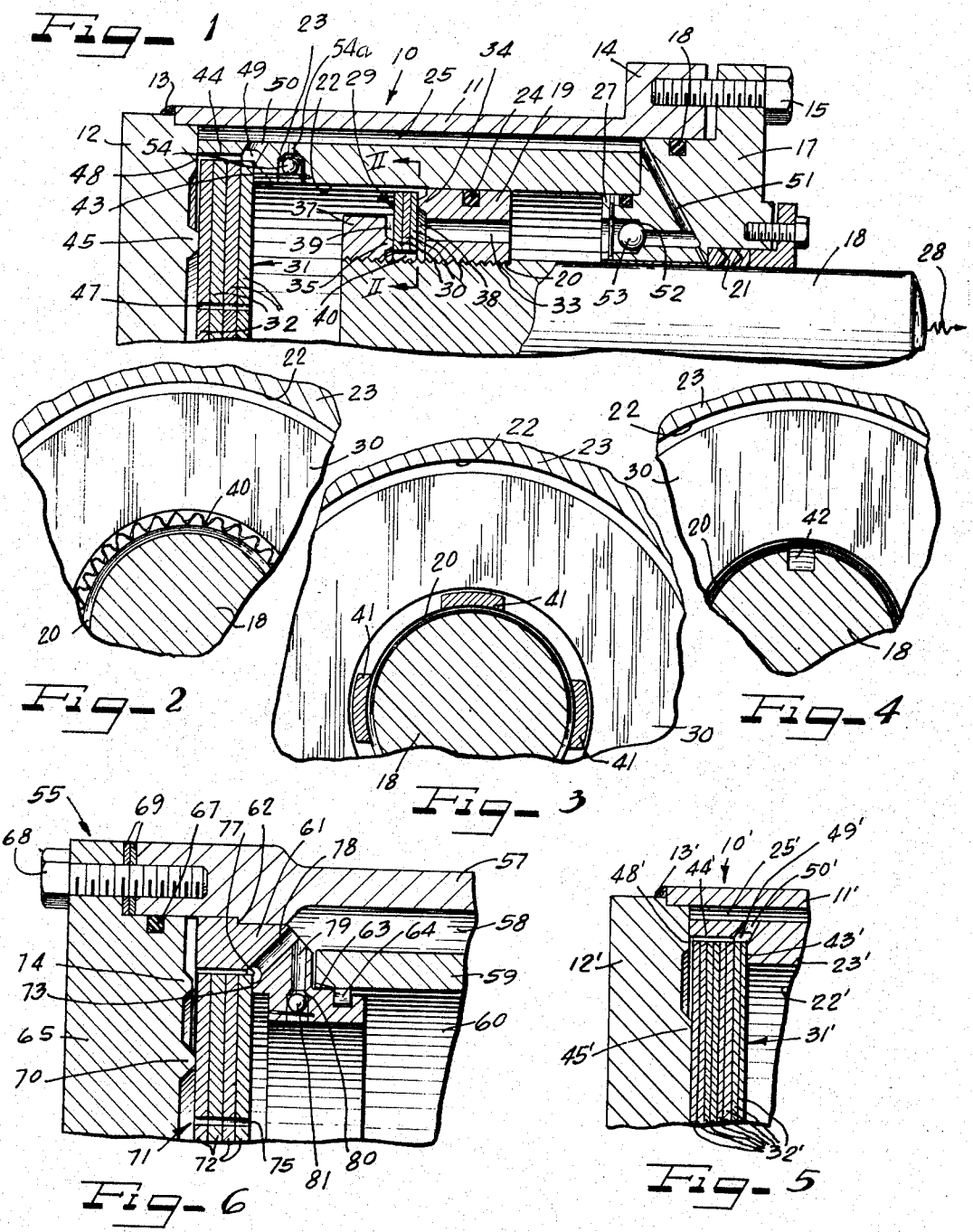

3,363,729
HYDRAULIC BUFFER WITH DISK CONTROL VALVE STRUCTURE
Rollin Douglas Rumsey, Buffalo, N.Y., assignor to Houdaille Industries, Inc., Buffalo, N.Y., a corporation of Michigan
Filed Oct. 23, 1965, Ser. No. 503,896
9 Claims. (Cl. 188—96)

ABSTRACT OF THE DISCLOSURE

A hydraulic buffer of the kind having a reservoir about a cylinder communicating through replenishing check valve means at opposite ends of the working chamber within which a piston operates in rectilinear buffing compression and return strokes, has stacked disk valves in control of buffing displacement of hydraulic fluid during operation of the piston.

---

This invention relates to improvements in hydraulic buffers of the reciprocal telescopic piston and cylinder type, and more particularly concerns new and improved valve structure for controlling displacement of the hydraulic fluid in the buffing operations of the buffer assembly.

Reciprocal hydraulic buffers are utilized to control movement toward one another of members of apparatus having operational regular or transitory forceful movement toward one another which must be at least appreciably slowed down, sometimes as a part of the operating cycle of the apparatus, and often merely to avoid damaging impact.

In some installations buffers are advantageous having control valving of the pressure relief type preloaded to yield under high velocity impacts at predetermined pressure to afford a high flow volume under a maximum predetermined pressure force. Ordinary types of relief valves have various shortcomings. For example, spring loaded ball valves require excessively large springs and take up a large amount of space which is generally of an inconvenient shape for ready incorporation into buffers. Differential area piston types of relief valve do not conveniently fit into buffer geometry. Pilot operated relief valves are too slow in their action to be of value.

Accordingly, it is an important object of this invention to provide new and improved control valve structure especially adapted for use in buffers and having readily predeterminable high pressure resistance values, high flow volume capability combined with rapid response time, simplicity in construction, minimum space requirements, great durability, substantially failure-proof, unusual reliability, uniform efficiency, and exceptionally low cost.

Another object of the invention is to provide a simple pressure relief valve structure capable of operating at very high pressure levels as encountered in, for example, the operation of hydraulic buffers.

A further object of the invention is to provide a valve structure of the character described which occupies but a minimum axial space in a hydraulic buffer.

A still further object of the invention is to provide a new and improved valve structure of the character indicated, which is operable on a piston, for example, to function in each opposite reciprocable direction of the piston, without duplication of parts.

Other objects, features and advantages of the present invention will be readily apparent from the following detailed description of certain preferred embodiments thereof taken in conjunction with the accompanying drawing, in which:

FIGURE 1 is a fragmental longitudinal sectional view through a hydraulic buffer embodying features of the invention;

FIGURE 2 is a fragmentary sectional detail view taken substantially on the line II—II of FIGURE 1;

FIGURE 3 is a fragmentary sectional detail view similar to FIGURE 2 but showing a modification;

FIGURE 4 is a similar fragmentary sectional detail view showing another modification;

FIGURE 5 is a fragmentary longitudinal sectional detail view showing a modification in the buffer head control valve; and FIGURE 6 is a fragmentary longitudinal sectional view of the head end portion of a modified buffer construction embodying features of the invention.

On reference to FIGURE 1, a typical reciprocably operable, telescopic hydraulic buffer 10 embodying features of the invention comprises a tubular housing body 11, having an end closure and head abutment disk member 12 secured in fluid-tight relationship to one end thereof as by means of welding 13. At its opposite end, the tubular body member 11 has an external integral annular attachment flange 14 to which is attached as by means of bolts 15, a flanged annular closure member 17 which is telescopically fitted into the bore of the body member and carries a leak-preventing annular seal 18.

Reciprocably guided by the closure flange 17 is a preferably cylindrical piston rod 18 on the inner end portion of which is a piston 19 which desirably comprises a separate member secured to the piston rod by means of threads 20 thereon. A rod seal 21 carried by the bearing end member 17 prevents external leakage along the rod.

Buffing resistance and energy absorption is effected by hydraulic liquid in a cylindrical working chamber 22 defined by a heavy walled tubular cylinder 23 within which the piston 19 is reciprocably operable. An annular seal 24 carried by the piston substantially prevents leakage between the piston perimeter and the cylinder wall. Between the outer perimeter of the cylinder member 23 and the inner perimeter of the tubular housing 11 is defined a reservoir chamber 25. At its front end the cylinder member 23 opposes the end closure member 12. At its rear end, the cylinder member opposes, and is maintained in concentric relation relative to the piston die by a centering boss 27 projecting forwardly and inwardly on the end closure member 17.

For purposes of illustration, the piston 19 is shown as at an intermediate position longitudinally within the cylinder chamber 22, but as installed for service, the piston may normally be in a retracted or ready position abutting or close to the centering boss 27 under the influence of return biasing means 28, schematically indicated.

Control valves means are provided for hydraulically resisting with predetermined force inward compression or buffing strokes of the piston 19. Desirably, also, return stroke buffing, but of lesser magnitude of hydraulic resistance is provided for. To this end, at least one of the relatively reciprocably related structures or means, comprising the housing and its related structures as the first means and the piston and its related structures as a second means, carries such control valve, and for practical reasons of efficiency and economy, both of such relatively reciprocal first and second means are equipped with valve structure embodying features of the invention, namely, comprising a plurality of circular spring disks each of a predetermined thickness and substantially concentrically assembled in a stack with means mounting the stack so that one margin of the stack is seated for normally blocking hydraulic flow but resiliently deflectable away from the seat about a fulcrum engaging the opposite side of the stack in radially spaced relation to the seat in response to predetermined hydraulic pressure. As exemplified in FIGURE 1, one such control valve 29 is carried in operative association with the piston 19 and comprises a stack of individual slidably related disks 30, and a second such control valve 31 is mounted in association with the housing structure and comprises a stack of individual slidably related disks 32.

In this instance, both in-stroke buffing and return stroke buffing control are effected by the valve 29 in respect to displacement of hydraulic fluid through one or more axially extending passages 33 through the piston 19. For this purpose, the stacked disk valve 29 is of annular form with its outer diameter slightly less than the diameter of the cylindrical wall of the chamber 22 and with an inner diameter which will clear the piston rod 18. A combined valve seat and fulcrum engaging the outer margin of the adjacent face of the stack is provided by an annular ridge 34 on the piston 19 radially outwardly about the front face area of the piston through which the passage 33 opens. Engaging the inner margin of the opposite or forward face of the valve stack is a combination valve seat and fulcrum annular ridge 35 provided on a thrust ring member 37 threadedly engaged onto the inner end portion of the piston rod 18 to oppose and preload the valve 29. Through this arrangement, and during inward buffing stroke of the piston 19, the disks 30 of the valve 29 are adapted to yield resiliently about the fulcrum provided by the ridge 34 in response to predetermined pressure against the front face of the valve to open or crack away from the ridge 35 serving as a valve seat, in the manner of a relief valve to pass hydraulic fluid from in front of the piston rearwardly through the passage 33. Over-deflection of the valve disk rearwardly is prevented by a stop surface 38 provided by the front face of the piston 19 normally spaced a limited distance from the inner margin of the valve disk stack. During return strokes of the piston, return stroke buffing resistance by the valve 29 is effective to a predetermined value until the disks 30 resiliently deflect away from the ridge 34 serving as a valve seat and about the fulcrum provided by the ridge 35 to afford displacement of hydraulic fluid from back of the piston forwardly through the passage 33. Over-deflection forwardly of the valve disks 30 is avoided by stop surface 39 provided by the thrust ring 37 and normally in limited spaced relation forwardly from the forward face of the valve disk stack.

Predetermining the cracking pressure with which the dual direction valve 29 will operate is readily accomplished through several factors, namely, in the built up stiffness of the spring itself through selection of the gauge and spring characteristics of the spring sheet metal or plate from which the disks 30 are stamped, the stiffening results of the hardening treatment to which subjected, the number of disks employed in the stack, and the diameter of the disks; the area of the disks between the ridges 34 and 35; and in the pre-load pressure setting afforded through the thrust ring 37.

It may be observed, that inasmuch as a smaller flow area is presented by the orifice opening at the center of the valve 29, a somewhat greater resistance to opening of the valve on inward buffer compression stroke occurs than during the pullout or return buffer stroke during which a larger orifice area is afforded about the outer perimeter of the disk stack.

In order to assure a substantially uniform annular flow passage about the inner perimeter of the valve 29 past the disks 30, suitable spacer means are provided between the inner edges of the disks and the perimeter of the piston rod 18, such for example as a convoluted spacer 40 (FIGS. 1 and 2). In another form such spacer means may comprise axially extending and circumferentially spaced spacer fingers 41, as shown in FIGURE 3, which may be extensions from either the piston 19 or the thrust ring 37. If preferred, instead of spacer means to provide free flow passage, one or more grooves 42 may be provided as shown in FIGURE 4, such as on the order of key way slots extending only throughout the short distance where passageway around the inner edges of the valve disks 30 is desired.

Operation of the control valve 31 as a predetermined high pressure blow off valve is affected by selection of suitable heavy gauge spring metal sheet stock from which to produce the valve disks 32, providing the proper number of the disks to afford the desired resistance to resilient bending deflection, and affording a predetermined effective pressure area. In the illustrated embodiment, an arrangement for predetermined valve opening deflection of the valve disk stack at pressures on the order of 10,000 to 30,000 p.s.i. comprises four of the disks which are shown as all of the same gauge which may be varied as to gauge for different predetermined pre-load ratings. Spring steel plate is a desirable material since it is easily fabricated by punching, turning, heat treating and grinding to close tolerances and high finish. The large number of disks enables the stress level in each disk to be low and the deflection of the stack of disks away from the valve seat to be relatively large in order to accommodate a large flow rate. Further, action on the valve at its pre-load is rapid and smooth.

In a simple assembly relationship, an annular valve seat 43 is provided for the outer margin of the inner face of the valve 31 by the head end portion of the cylinder member 23 which, for this purpose, has an annular inner valve clearance rabbet groove 44. Engaging the opposite face of the valve 31 in predetermined radially inwardly spaced loading relation to the valve seat 43 in an annular fulcrum ridge 45 projecting inwardly on the inner face of the closure head 12. In this instance, for high pressure use, the total thickness of the disk stack of the valve 31 is greater than the distance from the seat 43 to the fulcrum 45. To at least some extent, and in addition to the valve disk stiffness, pre-loading of the valve is effected by the thrust imposed by the fulcrum ridge 45 by drawing up on the bolts 15 to draw the head enclosure member 12 toward the valve until either the end member 12 abuts the opposing end of the cylinder member 23, or a predetermined limit on draw up is effected by means of shims (not shown) interposed between the attachment flange 14 and the flange 17.

A differential area relief valve arrangement is attained by the provision of a hole 47 through the disks 32 radially inwardly from the fulcrum ridge 45 so that the area inside the diameter of the fulcrum ridge 45 is substantially equalized in pressure with the inner face of the valve 31. Hence the operating force against the valve 31 is the differential area between the valve seat 43 and the fulcrum 45 and the area radially inwardly from the fulcrum.

Maximum deflection of the valve disk 32 and thus a positive limit upon the maximum stress level that will be encountered in operation, is desirably controlled by a stop surface 48 afforded by the end member 12 opposite the flexing margin of the valve disk stack. A practical spaced relationship in respect to a valve of about 5 inch diameter has been on the order of between $\frac{1}{32}$ and $\frac{1}{16}$ inch. This allows a closure velocity on a buffer of this size of about 15 to 25 miles per hour. These characteristics may be changed to accommodate the exact operating requirements, according to a general formula that the higher the velocity at which the buffer must operate, the thinner should be the valve disks 32, and if the forces are high a greater number of the valve disks shall be supplied.

Hydraulic fluid displaced from the working cylinder 22 past the control valve 31 passes from a receiving groove 49 radially outwardly adjacent to the valve seat 43 and one or more communication ports 50 into the reservoir 25. Replenishing of hydraulic fluid to the area back of the piston 19 is effected through a check valve passage 51 in the end 17 communicating at one end with the reservoir and opening at its inner end through a valve seat 52 controlled by a ball check valve 53 to close the passage during return buffing strokes of the piston thereof. Replenishing fluid flow from the reservoir 25 into the working chamber 22 during return stroke operation of the piston 19 is past a conventional one-way ball check valve 54 in a passage 54a through the front end portion of the cylinder 23. During compression strokes of the piston the check valve 54 closes the passage 54a.

In the modification of FIGURE 5 an arrangement is depicted in which the effective pressure acting upon the head control valve is the working pressure multiplied by the area between the valve seat and the fulcrum, minus twice the area radially inwardly from the fulcrum. To this end, the valve disks are imperforate so that there is no equalization of pressure on the forward face of the valve within the diameter of the fulcrum. This arrangement will provide a higher effective pre-load in relation to the thrust of the fulcrum ridge against the valve disk stack, inasmuch as the hydraulic fluid pressure acting on the valve disk at the center out to the fulcrum ridge acts to close the valve in opposition to the force acting on the valve disks between the fulcrum and the valve seat. Although this arrangement affords higher pre-load to be obtained with lower initial structural loads in the buffer, it does impose higher stresses in the disks and to compensate for this a larger number of disks are employed. Since all of the elements in the embodiment disclosed in FIGURE 5 are substantially identical with the disclosure in FIGURE 1, except for the larger number of valve disks and lack of central pressure equalization, substantial identity is reflected by primed reference numerals and the description in respect to the buffer 10' as to all so-identified elements is the same as for those elements in FIGURE 1, and those elements not shown may be assumed to be the same as in FIGURE 1 without the need for repetition.

In the embodiment of FIGURE 6, a buffer 55 is shown operating on substantially the same principles as the buffer 10 but with a modified head end structure. Here a tubular housing 57 affords a reservoir 58 about a working cylinder 59 having therein a cylindrical working chamber 60. Telescopically assembled with the head end portion of the cylinder 59 and retaining it in position is an annular head flange member 61 which beyond the end of the cylinder 59 is of larger outside diameter and engages in supported relation with the housing member 57 on an axially oriented shoulder 62 maintaining the flange member in slightly spaced relation to the adjacent end of the cylinder 59. This affords an air bleed passage to the reservoir 58 in cooperation with an air bleed orifice 63 in the normally upper inner margin of the head end of the cylinder and in general alignment with the split between the ends of a sealing ring 64 of the piston ring type affording a high pressure seal between the cylinder 59 and the flange member 61.

Closing the head end of the tubular housing 57 is a flanged head closure disk plate member 65 telescoped into the outer end of the housing member with a sealing ring 67 protecting against leakage. Bolts 68 secure the head closure member 65 in place on the housing 57, with shims 69 predetermining the pre-load thrust of an annular fulcrum ridge 70 on the inner face of the head closure member 65 against the outer face of a control valve 71 comprising face-to-face substantially equal diameter stacked spring valve disks in mutually backing free sliding engagement. Normally the outer margin of the inner face of the valve 71 seats substantially sealingly against an annular valve seat 73 provided by the flange member 61 in predetermined radially spaced relation to the fulcrum 70 and on a diameter at least close to the same diameter as that of the working cylinder 60. Opposite the valve seat 73, the end closure member 65 has a deflection limiting stop surface 74 in predetermined offset relation to the fulcrum ridge 70. For differential area pressure responsiveness of the valve 71, the valve disks 72 have aligned passages 75 therethrough radially inwardly from the fulcrum 70 to equalize pressure on the central area of both sides of the disks. Upon predetermined pressure blow-off hydraulic fluid displacement past the valve 71 passes from a collection groove 77 through a communication port 78 into the reservoir 58.

By virtue of the cylinder retaining and valve seat ring flange 61, a check valve by-pass around the valve 71 is enabled. To this end, a lateral passage 79 may be provided through the flange member 61 inwardly from the valve seat 73 and communicating between the inner perimeter of the flange member and the reservoir 58. Adjacent to its inner end, the passage 79 has a valve seat 80 seating a check valve such as a ball member 81 to close the passage 79 against high pressure hydraulic fluid during compression buffing strokes of the associated piston (not shown) but enabling replenishing fluid flow from the reservoir 58 during return strokes of the piston.

It will be understood that modifications and variations may be effected without departing from the scope of the novel concepts of the present invention.

I claim as my invention:

1. In a hydraulic buffer construction including a cylinder providing a working chamber, a housing enclosing the cylinder and providing a reservoir for hydraulic fluid, a closure member at one end of the cylinder and forming part of the housing, and a piston reciprocably operable in said working chamber:
   means defining a hydraulic fluid displacement passage between the reservoir and said working chamber at said one end of the cylinder;
   an annular valve seat between said passage and said working chamber and spaced from but facing toward said closure member;
   a control valve confronting said closure member and comprising a stack of circular spring disks each of predetermined thickness and with a margin of the stack seated on said seat;
   and a circular valve loading fulcrum facing axially inwardly on and integral with said closure member and engaging the opposite side of said stack spaced radially from said seat;
   said control valve disk stack being resiliently deflectable away from said seat about said fulcrum for displacement of hydraulic fluid from the working chamber through said passage to the reservoir in response to predetermined hydraulic pressure generated by said piston driving toward said closure member.

2. A hydraulic buffer as defined in claim 1, in which the closure member is mounted to be adjusted relative to said valve seat to modify the pressure of the valve loading fulcrum against the control valve.

3. A hydraulic buffer as defined in claim 1, in which said valve disks are full disks.

4. A high pressure fluid control valve construction of the character described, comprising:
   means providing an annular valve seat;
   means providing an annular fulcrum disposed concentric with and of smaller diameter than said seat and facing in opposition to the seat;
   a multi-spring full disk control valve stack having a margin engaging said valve seat and thrustingly engaged by said fulcrum under predetermined pre-load;
   said valve stack having an area inside the fulcrum diameter subject to the same fluid pressure as fluid pressure tending to unseat the valve from said seat.

5. In combination in a hydraulic buffer construction including a housing having therein a cylinder defining a working chamber and a piston reciprocable in the chamber:
   an end closure member forming part of said housing across one end of the cylinder and the working chamber;
   a mounting ring flange assembled between the cylinder end and said closure member at said one end of the working chamber;

said ring flange having a passage therethrough communicating with the reservoir;

an annular valve seat on said ring flange between said passage and the interior of said working chamber;

a stacked disk valve having a margin normally closingly engaging said valve seat;

and said closure member having a circular fulcrum projecting axially inwardly and spaced radially inwardly relative to said valve seat and loadingly opposing said valve on its face opposite to the face having said margin engaging said valve seat.

6. In a hydraulic buffer of the character described:

a cylinder defining a working chamber;

a piston rod extending into said working chamber and having a threaded end portion;

a piston threaded onto said end portion and operable reciprocably in said working chamber in the reciprocations of the piston rod;

a substantial extent of said threaded end portion projecting beyond said piston;

said piston having a passage therethrough spaced radially inwardly from its perimeter;

an annular valve seat on the forward end of said piston between said perimeter and said passage;

a stack of annular valve disks assembled with a margin on said valve seat and having an inner edge adjacent to said threaded end portion of the piston rod;

and a thrust ring member threadedly engaged onto said threaded portion of the piston rod and having an annular fulcrum engaging the inner margin of the valve disk stack and thrusting it under predetermined load toward the piston;

said piston having a clearance affording a spaced relation to the valve disk stack radially inwardly from said valve seat and aligned with said fulcrum so that the stack is deflectable away from said fulcrum into said clearance;

whereby displacement through said passage of hydraulic fluid from one side of the piston to the other side is enabled under the control of the valve by deflection of the valve from said seat in one direction and by deflection of the valve from said fulcrum in the other direction.

7. A hydraulic buffer as defined in claim 6, including spacer means between the inner edge of said valve disks and said threaded end portion of the piston rod and providing fluid passage along the threaded portion of the piston rod and between the space between the valve disks and the piston and thereby affording communication from said fulcrum through said passage when the valve is deflected from the fulcrum.

8. In combination in a hydraulic buffer construction including means defining a housing and a working cylinder and a reservoir communicating with at least one end of said cylinder, an end closure member forming a part of said housing at said one end of the cylinder;

a control valve mounted in operative relation to said one end of said cylinder and comprising a stack of spring disks mounted in confronting relation to said member between a valve seat spaced axially inwardly from said member about the thickness of said stack and normally sealingly engaging an inner face radially outer margin of the valve in fluid blocking relation to said communication with the reservoir and a preloading fulcrum facing axially inwardly on and a part of said member and engaging the outer face of the valve radially inwardly spaced relative to said valve seat;

said member having an annular clearance recess radially outwardly from said fulcrum;

and a piston reciprocably operatively mounted in said cylinder for effecting displacement of hydraulic fluid past said valve by pressure fluid deflection of the valve from said valve seat into said clearance.

9. In a hydraulic buffer construction including a cylinder providing a working chamber, a housing enclosing the cylinder and providing a reservoir for hydraulic fluid, a closure at one end of the cylinder on the housing, and a piston reciprocably operable in said working chamber:

means defining a hydraulic fluid displacement passage between the reservoir and said working chamber at said one end of the cylinder;

and annular valve seat between said passage and said working chamber and facing toward said closure;

a control valve comprising a stack of circular full spring disks each of predetermined thickness and with a margin of the stack seated on said seat;

and a circular valve loading fulcrum on said closure engaging the opposite side of said stack spaced radially from said seat;

said control valve disk stack being resiliently deflectable away from said seat about said fulcrum for displacement of hydraulic fluid from the working chamber through said passage to the reservoir in response to predetermined hydraulic pressure generated by said piston driving toward said closure;

said closure having a space between it and the control valve disk stack radially inwardly from said fulcrum, and the disks having aligned small diameter perforations therethrough to effect substantial equalization of pressure in said space with the inner face of the valve so that the operating force against the valve is the differential area between the valve seat and the fulcrum and the area radially inwardly from the fulcrum.

References Cited

UNITED STATES PATENTS

| 2,015,757 | 10/1935 | Moulton | 188—88 |
|---|---|---|---|
| 2,040,063 | 5/1936 | Padgett | 188—88 |
| 2,107,974 | 2/1938 | Bechereau et al. | 188—88 |
| 2,111,192 | 3/1938 | Padgett | 188—88 |
| 2,159,289 | 5/1939 | Nickelsen | 137—525 X |
| 2,214,364 | 9/1940 | Edwards | 137—525 |
| 2,296,732 | 9/1942 | Oyston et al. | |
| 2,521,202 | 9/1950 | Cloudsley. | |
| 2,785,774 | 3/1957 | Long et al. | 188—88 |
| 3,180,453 | 4/1965 | Murata | 188—100 |
| 3,256,961 | 6/1966 | De Carbon | 188—88 |

FOREIGN PATENTS

| 1,065,526 | 1/1954 | France. |

MILTON BUCHLER, *Primary Examiner.*

G. E. HALVOSA, *Examiner.*